United States Patent [19]
Werth

[11] Patent Number: 6,093,501
[45] Date of Patent: *Jul. 25, 2000

[54] FUEL CELL USING AN AQUEOUS HYDROGEN-GENERATING PROCESS

[75] Inventor: John Werth, Princeton, N.J.

[73] Assignee: H Power Corporation, Belleville, N.J.

[*] Notice: This patent is subject to a terminal disclaimer.

[21] Appl. No.: 09/262,428

[22] Filed: Mar. 4, 1999

Related U.S. Application Data

[63] Continuation-in-part of application No. 08/477,524, Jun. 7, 1995, Pat. No. 5,629,102, and a continuation-in-part of application No. 08/477,523, Jun. 7, 1995, Pat. No. 5,643,352, and a continuation-in-part of application No. 08/839,484, Apr. 14, 1997, abandoned.

[51] Int. Cl.[7] .................................................. H01M 8/04
[52] U.S. Cl. .............................. 429/17; 429/19; 429/13; 429/12
[58] Field of Search .................................. 429/17, 19, 13, 429/12

[56] References Cited

U.S. PATENT DOCUMENTS

| | | | |
|---|---|---|---|
| 5,510,201 | 4/1996 | Werth | 429/17 |
| 5,629,102 | 5/1997 | Werth | 429/17 |
| 5,830,426 | 11/1998 | Werth | 429/17 |
| 5,840,270 | 11/1998 | Werth | 429/17 X |

*Primary Examiner*—Maria Nuzzolillo
*Assistant Examiner*—Angela J. Martin
*Attorney, Agent, or Firm*—Salzman & Levy

[57] ABSTRACT

An improved fuel cell system that utilizes hydrogen and air. The hydrogen of the fuel cell is derived from a hydrogen-generating process wherein $H_2O$ is passed over a bed of iron material. The hydrogen generating process uses a catalyst, or freshly-ground iron material, or both, and generates the hydrogen for the fuel cell in situ at lower-than-normal temperatures when the $H_2O$ reacts with the iron material. The fuel cell can be used to power a stationary system or a land vehicle, such as an automobile. The bed of iron material can be replenished periodically or continuously.

6 Claims, 2 Drawing Sheets

FUEL CELL USING AN AQUEOUS HYDROGEN-GENERATING PROCESS

RELATED PATENT APPLICATION

This patent application is a continuation-in-part of application Ser. No. 08/477,524, filed Jun. 7, 1995, now U.S. Pat. No. 5,629,102 and application Ser. No. 08/477,523, filed Jun. 7, 1995, now U.S. Pat. No. 5,643,352, and application Ser. No. 08/839,484, filed Apr. 14, 1997, now abandon; and related to U.S. Pat. No. 5,830,426, U.S. Pat. No. 5,840,270, and U.S. Pat. No. 5,510,201, all related to fuel cells. Each was assigned to a common assignee. The present application is meant to incorporate the teachings of these patents herein by way of reference.

FIELD OF THE INVENTION

The present invention pertains to an improved fuel cell system that utilizes hydrogen and air reaction. The hydrogen of the fuel cell is derived from a hydrogen generating process wherein $H_2O$ is passed over a bed of iron material. The fuel cell can be used in a stationary power source or to power a land vehicle, such as an automobile. The bed of iron material is replenished in situ, and the generated hydrogen is consumed as it is generated. The hydrogen generating process produces hydrogen for the fuel cell at lower-than-normal temperatures when the $H_2O$ reacts with the iron material.

BACKGROUND OF THE INVENTION

Operating a hydrogen-air fuel cell to generate sufficient electricity to operate a stationary power source or an electric motor vehicle is affected by the amount of hydrogen that can be delivered thereto. The generation of hydrogen by passing steam at or about 700° C. over a bed of iron is well known in the art. Generating hydrogen at elevated temperatures, however, is not practical for most stationary systems or for any automotive systems. Automotively, it is not safe, and it reduces the efficiency needed to compete with heat engines. Therefore, the hydrogen-air fuel cell of this invention must be supplied with hydrogen generated in situ at a practical generating temperature.

The electrical automobile is currently under intense development due to the twin needs to reduce air pollution and conserve fuel resources. One of the major difficulties in the development of the electrical automobile is supplying the power for the electrical drive motors. Such power is currently furnished by batteries. Present battery technology, however, is not capable of providing the energy needed to run the automobile over extended distances.

To the best of the inventor's knowledge, no one has solved the practical problems of using a hydrogen-air fuel cell to generate the electrical energy needed to power an automotive vehicle. There may be many reasons for this, not least of which is the danger of storing great amounts of hydrogen fuel in the vehicle.

This invention reflects the discovery that hydrogen can be generated in situ at reasonable temperature, and then passed into a hydrogen-air fuel cell to generate electricity.

The low-temperature process of this invention is made possible by catalyzing the reaction, by utilizing freshly-ground particles that increase the efficiency of the iron, or both, so that the iron is able to enter into the water/iron reaction at lower-than-normal temperatures.

The iron particles are ground when the vehicle is initially powered and during hydrogen generation. The instantaneous grinding of the iron particles in situ is necessitated because iron becomes rapidly oxidized after grinding. Fifteen minutes after grinding, iron will lose its enhanced reactivity. Therefore, after the initial grinding, the grinding process should continue.

The freshly-ground reactive iron is easily deposited in a compartment in the vehicle. It is easily handled as sealed packet(s) of freshly-ground particulates, but, additionally, it can be freshly-ground in situ aboard the vehicle. The particles range in diameter size from approximately 25 to 1,200 $\mu$m; an average-sized distribution is one in which at least 20% of the particles are less than 300 $\mu$m in diameter. It is preferable that at least 50% are less than 300 $\mu$m in diameter. The average particle density ranges from approximately 1 to 7.8 g/cc, with a non-compressed packed particle density ranging from about 1.5 to 3 g/cc. The particles have a surface area greater than approximately 0.001 meter$^2$/g.

A low-temperature iron-water reaction would normally require impractical amounts of iron in order to rapidly generate enough hydrogen at the usual reduced activity. However, using a catalyst greatly enhances the kinetics between $H_2O$ and iron, thus reducing the amount of iron needed for reaction with the water. For example, when using high-temperature steam for the hydrogen generation, a medium-sized electrically-powered car, which has its electricity generated by a hydrogen-oxygen fuel cell, might consume about 50 pounds of iron during a one-hour trip. In order to obtain the same amount of hydrogen from a steam reaction at 250° C., more than 400 pounds of heated iron would be required under present state-of-the-art methods. Of course, the added weight of the iron would reduce mileage, and the additional 350 pounds of iron would then need the requisite heat to bring it to operating temperature. In other words, the additional 350 pounds of iron would be nothing short of excess baggage. The need to carry and heat more iron than is stoichiometrically required is completely impractical.

SUMMARY OF THE INVENTION

In accordance with the new iron material or the use of a catalyst, there is also provided a method for generating hydrogen in situ. The method of this invention comprises the steps of: (a) fueling a hydrogen generator with iron material; (b) generating hydrogen in situ utilizing an iron and $H_2O$ reaction; (c) and consuming the in situ generated hydrogen as it is generated.

Hydrogen to fuel the fuel cell is supplied in situ by a bed of iron that is made to react with $H_2O$, desirably in the presence of a catalyst, at temperatures not exceeding approximately 250° C. The hydrogen for fueling the fuel cell is generated in situ by using a storage compartment containing the inventive iron materials, or by catalyzing the reaction, or both.

In a vehicle application, the hydrogen is generated by passing water or low-temperature steam over desirably freshly-ground iron, which then becomes iron oxide. The vehicle's operator obtains a fresh charge of the new iron materials from an iron fuel station for placement in a compartment of the vehicle. The exchange of the iron oxide with a fresh iron charge at the fuel station is analogous to the current process for returning empty soda cans to a supermarket. For the spent iron (iron oxide), the fuel station would give the vehicle operator a cash allowance toward the purchase of a new iron charge. The old, spent iron would then be recycled into fresh iron by a reduction process at the fuel station or at a central distribution facility.

The iron materials of this invention may comprise in situ freshly-ground particulates. The particles range in diameter size from approximately 25 to 1,200 μm. An average-sized distribution is one in which at least 20% of the particles are less than 300 μm in diameter. It is preferable that at least 50% are less than 300 μm in diameter. The average particle density ranges approximately from about 1 to 7.8 g/cc, with a non-compressed packed particle density ranging from about 1.5 to 3 g/cc. The particles have a surface area greater than approximately 0.001 meter$^2$/g.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a method of powering a hydrogen-air fuel cell to generate electricity. Hydrogen to supply the fuel cell is produced in situ by passing low-temperature steam or heated water over an activated iron bed containing freshly-ground particles of iron in the presence of a catalyst such as an alkali metal hydroxide.

Figure 1:
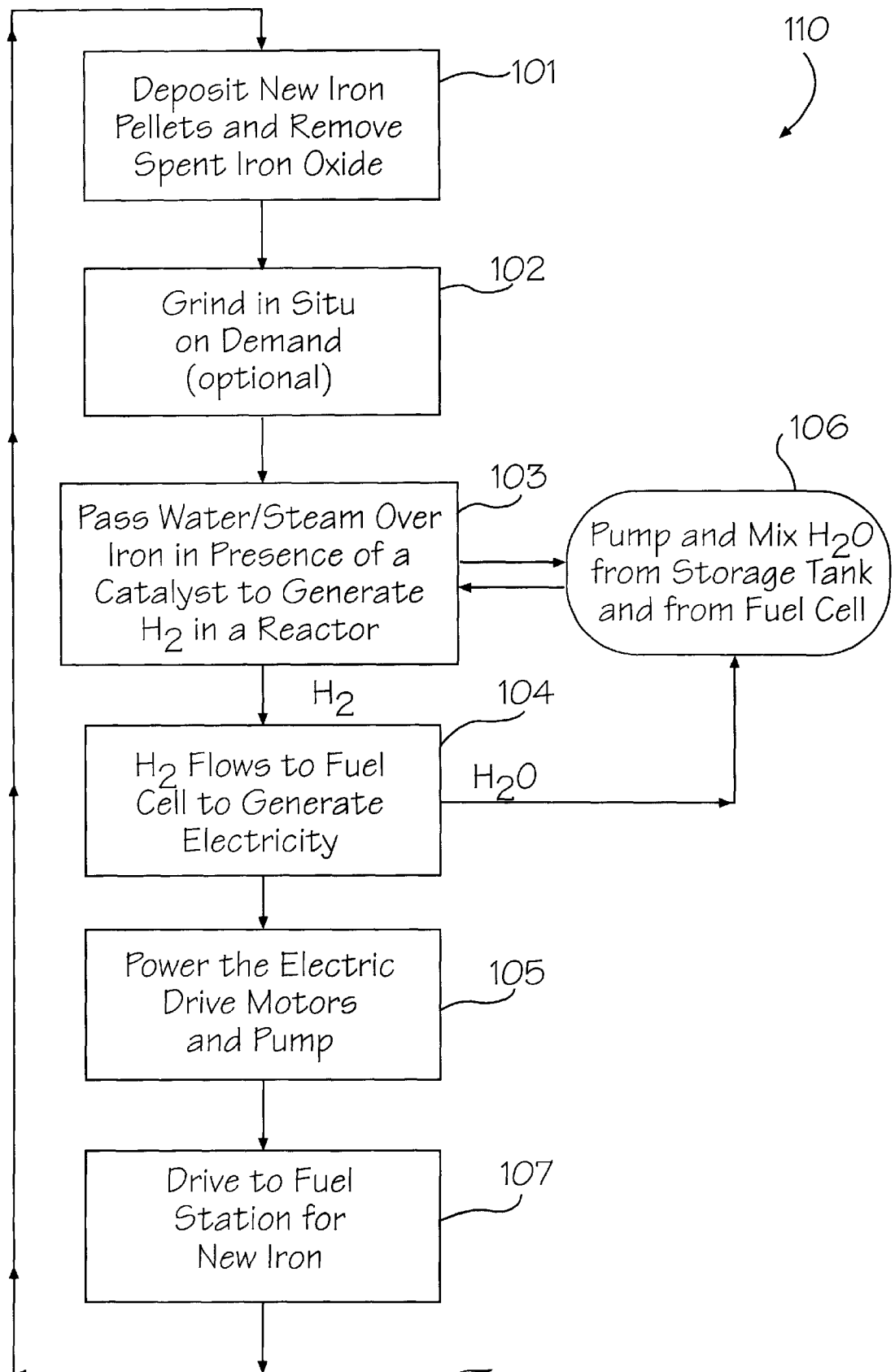
FIG. 1 illustrates a flowchart diagram of a method using the inventive iron composition of this invention.

Now referring to FIG. 1, a flow chart diagram 110 of the inventive method is shown for an electrical vehicle. The operator of the vehicle having electrical drive motors for driving the automobile obtains a fresh charge of iron, step 100, from a fuel station. The spent iron (iron oxide) that is in the iron compartment is removed and replaced with the fresh charge of iron particles or pellets, step 101. The iron is kept reactive by the continuous grinding of that which is deposited in the iron compartment, step 102. The compartment itself can also be tumbled, so as to mix or stir the iron.

The vehicle is equipped with a fuel cell that operates by a hydrogen-air reaction to produce electricity and replacement water. The hydrogen is generated in situ by passing heated water or low-temperature steam at approximately between 230° C. to 250° C. over the iron deposited in the iron compartment and in the presence of a catalyst, step 103. The grinding of the iron within the compartment, step 102, makes the iron more reactive, so that the conversion of the iron to iron oxide, which is measured in percent per minute (%/min.), can take place at lower-than-normal water temperatures, as illustrated below in Table 1.

TABLE 1

| H$_2$O Temp. (° C.) | Conv. Rate (Ground) | Conv. Rate (Unground) |
|---|---|---|
| 450 | 14.1 | |
| 400 | 11.5 | 3.7 |
| 300 | 4.0 | 1.8 |
| 200 | 2.4 | 0.8 |

The generated hydrogen flows to the hydrogen-air fuel cell, step 104, where electricity is generated, along with water. The water is pumped to a second compartment or water tank, step 106. This water is used to replenish the water used to generate the hydrogen in step 103. The generated electricity of the fuel cell is used to power the drive motors of the vehicle, step 105. The operator of the vehicle drives to the fuel station to obtain a new charge of iron, step 107, when the majority of the fuel (iron) has been spent (i.e., converted to iron oxide). The automotive power process is then essentially repeated.

Figure 2:
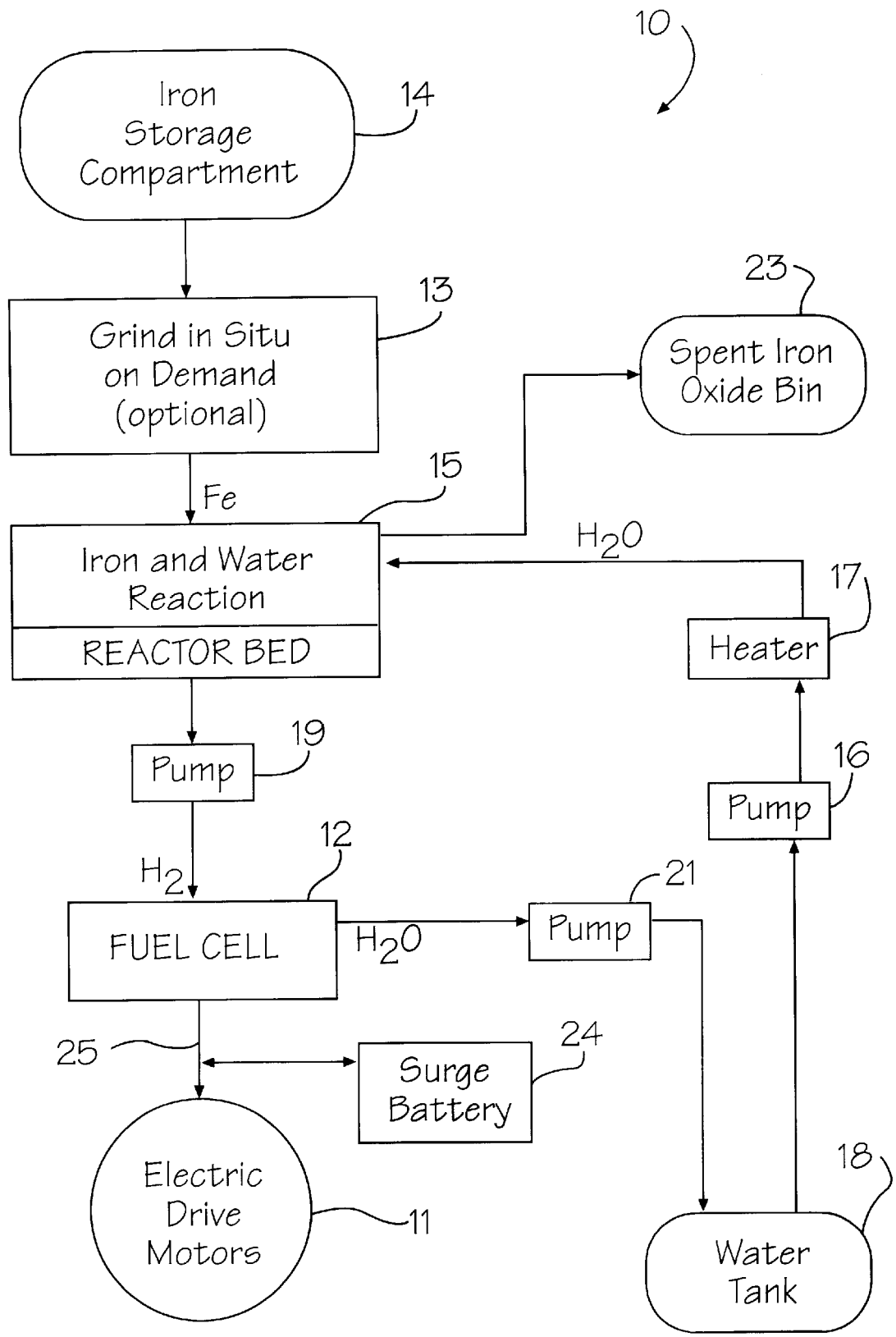
FIG. 2 depicts a schematic diagram of the system of an electrical vehicle that utilizes the new iron composition of the invention.

Referring to FIG. 2, a schematic diagram 10 of the system for an electrical vehicle utilizing this invention is shown. The vehicular system comprises a number of drive motors 11 that receive their electrical power from a hydrogen-oxygen fuel cell 12. A surge battery 24 supplies additional power to the motors during surges in demand, such as when the vehicle accelerates or climbs a steep hill. The fuel cell 12 receives the hydrogen necessary for its hydrogen-oxygen reaction from a compartment 15 that contains an iron bed. A grinding apparatus 13 continuously refreshes the iron bed disposed in compartment 15. Water is pumped from a water tank 18 via pump 16 to the iron bed compartment 15. The water is heated to the proper temperature for reaction by (for example) a heating coil heater 17 as it is pumped to the iron bed 14.

The hydrogen that is produced in compartment 15 flows to the fuel cell 12 via pump 19, in order to produce electricity. In producing the electricity, the fuel cell 12 provides water as a by-product. This by-product water is pumped via pump 21 to the water tank 18 in order to help replenish the water pumped to compartment 15. Additional water may have to be periodically added to tank 18 so as to maintain a proper supply level. The electricity produced by the fuel cell 12 is also used to power the respective pumps 16, 19 and 21, as well as the coil heater 17 and the grinding and vibrating apparatus 13.

A small storage battery (not shown) can be used to power the system during the initial, start-up sequence of operation. This battery can be recharged by the fuel cell during steady-state operation.

According to the present invention, the fuel cell reactor 12 can be built integrally with reactor bed compartment 15. The reactor bed compartment 15 generally comprises one or more tubes that are filled with a porous or powdered metal. The tubes are preferably made from materials that conduct heat, although in certain embodiments of the present invention (whereby heat is generated internally, such as by O$_2$ injection), heat-conductive materials are not necessary. Preferably, the tubes are made from materials such as inconel or stainless steel. The size of the tubes, of course, will depend upon the size of the generating system. However, they generally have an inside diameter of at least about ¼ inch (0.635 cm) and a length of at least about 6 inches (15 cm). The number of tubes will also vary, depending upon the size of the system. The general range is from about 1 to 100 tubes; the more preferable range is from about 1 to 5. The tubes may also be of varying sizes and shapes, including curves, spirals, etc. The tubes may also be disposed at various angles.

The iron materials of this invention comprise in situ freshly-ground particles, ranging in diameter size from approximately 25 to 1,200 μm. An average-sized distribution is one in which at least 20% of the particles are less than 300 μm in diameter. It is preferable that at least 50% are less than 300 μm in diameter. The average particle density ranges from approximately 1 to 7.8 g/cc, with a non-compressed packed particle density ranging from about 1.5 to 3 g/cc. The particles have a surface area greater than approximately 0.001 meter$^2$/g.

To initiate the reaction, the water in the container 18 is heated to form steam, in most cases. However, the present invention contemplates the use of heated water instead of steam, by using a catalyst. The water flows into and reacts with the metal reactant to produce a metal oxide, such as $Fe_3O_4$ and hydrogen gas.

One way to speed the hydrogen-producing reaction is to inject water and air into the reactor zone, so that the rapid oxidation of the metal and the catalytic burning of the hydrogen (produced by the reacting water) will help heat up the metal reactor to the necessary temperature for reaction. Another way to supply the necessary start-up heat is to burn a small amount of conventional fuel (such as compressed natural gas, propane or gasoline) in a separate burner, employing suitable means to transport the generated heat. A simple source of start-up heat may be a small storage battery that furnishes power to a heating bulb or heating coil that is disposed within or adjacent to the energy-producing device.

A more complex scheme for supplying start-up heat to the reactor zone is to employ a plurality of reactor beds in the reaction zone (such as elongated tubes of metal reactant), with at least either one small reactor bed or beds of graduated sizes. The smallest bed is brought up to operating temperature first with a battery or a small burner. The hydrogen it produces is burned with air to form water in the fuel-cell chamber, so as to heat up the larger reactor beds.

In the case of beds of graduated sizes, the heat produced by the next larger bed may be used to heat up the next larger bed, etc.

The catalyst may be added to the system by galvanically linking it via an electrolyte that is dissolved in the heated water with an electrical contact between a catalyzed sheet or basket and the metal reactant.

In such a case, the water need not be heated to form steam. The water can simply be transferred to the reaction zone by suitable means, such as pumping and gravity feed. The catalyst is added as a soluble compound to the water of reaction. When forming hydrogen and metal oxide, the interaction between the metal of reaction (such as iron) with the water of reaction and with the soluble compound causes the metal reactant to be catalyzed for faster reaction with water. It is believed that this technique enables the metal catalyst to come into permanent contact with the metal reactant, thus lowering its hydrogen over-potential and accelerating the generation of hydrogen at relatively low temperatures, such as about 250° C.

One of the advantages of the present invention over other hydrogen production systems (including metal-hydride-based systems) is its ability to regenerate or reform the spent metal oxide after completion of the reaction and the production of hydrogen. This advantage is even more significant because of the relatively low cost involved in the regeneration of spent metal oxide. The system of the present invention may employ a variety of methods to regenerate the spent metal oxide. The spent metal oxide can be stored in the bin 23, as illustrated in FIG. 2.

One method of regeneration comprises reacting the spent metal oxide with a reducing gas, a mixture of gases or a liquid. Because of its relatively low cost, the presently preferred reducing agent is reformed natural gas. This gas generally comprises a mixture of hydrogen, carbon monoxide, carbon dioxide and residual steam. While hydrogen and carbon monoxide are the only active reducing agents, the metal/metal-oxide bed that is being regenerated is not harmed by the presence of the other two components. If hydrogen gas were available at a lower cost than reformed natural gas, it, too, could be used, provided that heat is added to the reaction, which causes the process to be somewhat endothermic. Where available, relatively pure carbon monoxide can also be used as a reducing agent. However, this would contribute about four to five times more carbon dioxide to the atmosphere than would reformed natural gas. Also, it is more exothermic than is needed to sustain the reaction. Thus, pure carbon monoxide is a less efficient reducing agent.

The gaseous reducing agents may be supplied as a reformed liquid fuel such as reformed methanol, reformed ethanol, reformed petroleum derivatives and reformed or decomposed ammonia.

The reformed fuels may be derived by various techniques including: (1) steam-reforming (in which the fuel in gaseous form reacts with steam); (2) partial oxidation (in which the fuel reacts with oxygen or air in proportions less than that needed for complete oxidation); or (3) autothermal reforming (in which the fuel partially reacts with steam and partially with oxygen or air). In terms of yield of hydrogen per unit of fuel, steam-reforming is more efficient than partial oxidation. Steam-reforming is endothermic, while partial oxidation is exothermic. With regard to both hydrogen yield and heat addition/removal, autothermal reforming falls between steam-reforming and partial oxidation. The selection of a particular reforming process will thus be made for a particular operation based upon factors which include the hydrogen yield required, equipment costs and complexity, and the overall process heat requirements.

Heat must be supplied to the reduction reaction, since the reduction reaction by hydrogen is generally endothermic, taking place at about 800° C. to 1,100° C. One method of doing this (autothermal reforming) is to inject air or oxygen into the reactor bed. This causes some of the reducing agent to burn, thereby heating up the regeneration reaction zone. Another method is to burn the vent gas from a hydrogen-producing reaction and then transfer its combustion heat to the regeneration reaction zone through the walls of the reactor. Still another method is to burn part of the reducing agent upstream of the reforming device and transfer the combustion heat across the reactor bed walls of the metal/metal-oxide containing reactor. Another approach is to make the reaction of the reducing agent and the metal oxide exothermic, which can be accomplished by maintaining enough carbon monoxide in the reducing gas mixture to make the sum of the reduction reactions slightly exothermic. Still another scheme for supplying the necessary heat to maintain the regenerating reaction is to burn vent gas from another nearby regenerating bed. This vent gas normally contains steam, carbon dioxide and unreacted reformate.

In general, the vent gas from the reaction between iron oxide and reformate does not produce only a mixture of water and carbon dioxide. The equilibrium composition of the vent gas also includes unreacted hydrogen and unreacted carbon monoxide. Some of the unreacted reducing mixture can be burned, so as to satisfy the endothermic need of either the iron reaction or the reformer reaction; but if all of it were burned or vented, the overall efficiency would decrease. To avoid this, some water may be condensed from the vent gas; the resulting, drier mixture may then be fed to a second-stage iron oxide regenerator to produce more elemental iron. The vent gas of the second stage would then be burned to provide the needed endotherms, and the overall efficiency would be better than that of a single-stage regenerator.

The reformation process may be carried out at a location away from the fuel station, such as at a central plant. The metal and spent metal oxides may be transferred to and from refueling stations near the site of the central station. The metal powder or material is preferably conveyed into and out of the metal-water reaction chamber 14 during refueling by suitable means, such as gravity flow. The metal and metal oxides are transferred from the refueling stations to the central reforming plant by a variety of means, including trucking, railroad car and the like. The recycling of the metal reactant can theoretically occur indefinitely.

As an alternative to using a relatively large, removed central processing facility for reforming the spent metal oxide, smaller reformer units at the site of the refueling station may be used. As with the centralized reforming unit, the on-site reforming units may be used to convert the spent metal oxide to metal reactant (as previously described) by using, for example, reformed natural gas. The reduced metal may then immediately be used to generate hydrogen in a hydrogen-powered device; stored for subsequent use to generate hydrogen in such a device; or used as an intermediate storage device, in conjunction with metal hydride storage beds. A convenient way to utilize the reduced metal as an intermediate storage device in combination with a metal hydride bed is to react the reduced metal with steam to produce slightly wet hydrogen. The hydrogen is then dried by suitable means (e.g., by desiccants) known in the art.

A small amount of hydrogen generated from the fuel cell can be compressed and stored for start-up/heat-up purposes. The hydrogen is diverted by means of a solenoid valve that is controlled by a pressure sensor or pressure switch. The hydrogen storage device acts like a storage battery, supplying energy during start-up and absorbing it during normal driving for later use.

During the regeneration of spent metal oxide, the reformed natural gas may contain sulfur impurities, which may accumulate in the bed over many regeneration cycles. The sulfur will react with the metal reactant, creating metal sulfides. The metal sulfides might not decompose either by steam upon discharge or by fuel or reformate upon recharge. This will eventually and irreversibly tie up a large fraction of the metal reactant bed as metal sulfides instead, thereby preventing it from switching from metal oxide to elemental metal.

In order to overcome this contamination problem, unwanted metal sulfide (e.g., FeS) can be converted to sulfur dioxide ($SO_2$) and some metal oxide (e.g., one of the iron oxides) by briefly (i.e., in 1 to 15 minutes) passing a stream of air over the heated bed of spent metal oxide before that bed is reduced to elemental metal. Since the bed must be heated anyway, in order to regenerate it, little or no additional heating is needed to remove the metal sulfide by hot air oxidation. The risk of explosion during transition through the bed from air to reformate or fuel can be significantly reduced by briefly purging the bed with steam, carbon dioxide, nitrogen or any other suitable inert gas. In particular, the mixture of steam and $CO_2$ from another bed undergoing regeneration is a readily available, essentially cost-free, purging agent.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of powering a fuel cell for a power generating system, using an $H_2O$—iron reaction for the generation of hydrogen in situ, comprising the steps of:
    a) operating a fuel cell in situ by fueling said power generating system with iron material;
    b) reacting the iron material of step (a) with $H_2O$ in an iron—$H_2O$ reaction to generate hydrogen in situ;
    c) consuming in situ hydrogen of step (b) as it is generated in situ, in order to power said power generating system; and
    d) powering said power generating system as said generated hydrogen is consumed in accordance with step (c), at a conversion rate exceeding 2 percent per minute conversion of iron to iron oxide.

2. The method of powering a power generating system in accordance with claim 1, further comprising the step of:
    e) utilizing a catalyst in step (b) in order to enhance reactivity of said iron—$H_2O$ reaction.

3. An improved $H_2O$—iron reaction method in the generation of hydrogen in situ for a power generating system, comprising the steps of:
    a) fueling a power generating system with iron material in order to generate hydrogen in an $H_2O$—and—iron reaction, said $H_2O$—and—iron reaction taking place in situ;
    b) consuming said hydrogen generated in the $H_2O$—iron reaction of step (a) substantially as it is being generated, in order to provide safe operation of said power generating system; and
    c) utilizing the consumed hydrogen of step (b), in order to power said power generating system.

4. An improved $H_2O$—iron reaction method in the generation of hydrogen in situ in a system, comprising the steps of:
    a) fueling a system with iron material in order to generate hydrogen in an $H_2O$—and—iron reaction, said $H_2O$—and—iron reaction taking place in situ;
    b) generating said hydrogen in the presence of a catalyst, so as to enhance the reactivity of the $H_2O$—iron reaction; and
    c) consuming the generated hydrogen of step (b) substantially as it is being generated, in order to power said system.

5. An improved $H_2O$—iron reaction method, comprising reacting $H_2O$ and iron material to form hydrogen in situ within a system, comprising the steps of:
    a) fueling a system with a charge of iron material;
    b) reacting said iron material in an $H_2O$—and—iron reaction in situ, in order to produce hydrogen in sufficient quantity to power said system; and
    c) consuming said hydrogen substantially as it is being produced, in order to power said system.

6. The improved $H_2O$—iron reaction method in accordance with claim 5, wherein the reacting step (b) is accomplished in the presence of a catalyst for enhancing the iron—$H_2O$ reaction, so as to provide sufficient amounts of hydrogen to power said system.

* * * * *